3,462,536
METHOD OF INHIBITING DECARBOXYLASE
John M. Chemerda, Metuchen, Meyer Sletzinger, North Plainfield, and Frederick W. Bollinger, Westfield, N.J., assignors to Merck & Co., Inc., Rahway, N.J., a corporation of New Jersey
No Drawing. Continuation-in-part of application Ser. No. 45,789, July 28, 1960. This application June 29, 1961, Ser. No. 120,493
Int. Cl. A61k 27/00
U.S. Cl. 424—309                         17 Claims

ABSTRACT OF THE DISCLOSURE

The invention relates to a method for inhibiting mammalian decarboxylase by administering α-hydrazino-optionally substituted β-phenyl propionic acids, their lower alkyl esters and non-toxic salts thereof to a mammal.

---

This application is a continuation-in-part of our copending application, Ser. No. 45,789, filed July 28, 1960, now abandoned.

This invention relates to a method of inhibiting mammalian decarboxylase. More specifically, this invention relates to a method of inhibiting mammalian decarboxylase by administering α-hydrazino-β-hydroxyphenylpropionic acids, their acyl esters their lower alkyl esters and the non-toxic salts of these compounds. The compounds used in the method of our invention can be represented by the formula—

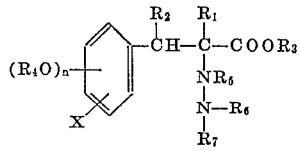

in which $R_1$, $R_2$ and $R_3$ are each hydrogen or lower alkyl, $R_4$ and $R_5$ are hydrogen or lower alkanoyl, $R_6$ is hydrogen, lower alkanoyl, lower alkyl or together with $R_7$ lower alkylidenyl, $R_7$ is hydrogen, lower alkyl or together with $R_6$ lower alkylidenyl, $n$ is 0, 1, 2 or 3, and X is hydrogen, halogen, alkyl or trifluoromethyl, X being para to the acidic side chain when other than hydrogen.

α-Methyl-β-3,4-dihydroxyphenylalanine has been found to be an anti-hypertensive agent. Experimentally, it has been found to inhibit several amino-acid decarboxylases in vitro and in vivo. It has also been observed experimentally to deplete catecholamines such as norepinephrine from the tissues. The anti-hypertensive properties do not seem to be the result of either of these actions individually but appears rather to be due to a combination of these properties, possibly together with other physiological actions.

We have found that α-hydrazino-phenylpropionic acids and their derivatives, of the above description, are the most potent inhibitors of decarboxylases yet found. In many cases, these compounds have no effect at all on the depletion of catecholamines. In other cases, such depletion occurs in addition to the decarboxyase inhibition.

The inhibition of mammalian carboxylase is an important part of the physological action of the α-methyl-dihydroxyphenylalanine type of antihypertensives. It is, in effect, an antimetabolite action which prevents the formation of norepinephrine in the body by blocking the decarboxylation of its amino acid precursors. Even though a compound already has such activity to some extent, admixture with a potent inhibitor such as the hydrazino acids used in our invention greatly potentiates the antihypertensive properties. Such a mixture is α-methyl-3,4-dihydroxyphenylalanine and α-hydrazino-α-methyl-3,4-dihydroxyphenylpropionic acid. The former's hypotensive action is greatly potentiated by the latter, although the hydrazino acid is itself inactive as an antihypertensive agent. Even more striking is the mixture of the same hydrazino acid with α-methyl-m-tyrosine. The latter, a strong catecholamine depletor and a weak decarboxylase inhibitor, is inactive in reducing blood pressure by itself. However, when administered in mixture with the hydrazino acid, also an inactive compound, the result is a reduction of blood pressure. The mixture of two compounds, one powerful decarboxylase inhibitor and the other a strong catecholamine depletor, both of themselves inactive, is antihypertensive.

The inhibition of decarboxylase is also of importance in the treatment of certain disorders of the colon. In some persons, the cells in the intestines, and perhaps elsewhere, develop over activity in the production of serotonin from 5-hydroxytryptophane. The result of such over abundance of serotonin is constant flushing of the colon and evacuation of the bowels. Further, unless this condition is controlled, it can develop into much more serious trouble. Decarboxylase inhibitors prevent the formation of the serotonin and therefore control such diarrhea. Powerful decarboxylase inhibitors such as the hydrazino acids used in this invention, especially those having no other physiological activity, are peculiarly adapted to such use.

The compounds used in our invention inhibit not only dioxyphenylalanine, decarboxylase but also histidine decarboxylase. They thus show promise of use as antihistiminics as well.

There is also some evidence that, unlike hydrazines generally, these α-hydrazino acids do not operate by trapping the coenzyme, pyridoxal phosphate. They are thus pure decarboxylase inhibitors.

The compounds used in our invention include among others the following:

α-hydrazino-β-phenylpropionic acid;
α-hydrazino-α-methyl-β-phenylpropionic acid;
α-hydrazino-β-3-hydroxyphenylpropionic acid;
α-hydrazino-α-methyl-β-3-hydroxyphenylpropionic acid;
α-hydrazino-α-methyl-β-4-hydroxyphenylpropionic acid;
α-hydrazino-β-3,4-dihydroxyphenylpropionic acid;
α-hydrazino-α-methyl-β-3,4-dihydroxyphenylpropionic acid;
α-hydrazino-α-methyl-β-2,3-dihydroxyphenylpropionic acid;
α-hydrazino-α-methyl-β-2,4-dihydroxyphenylpropionic acid;
α-hydrazino-α-methyl-β-3-hydroxy-4-methylphenylpropionic acid;
α-hydrazino-α-methyl-β-3-hydroxy-4-chlorophenylpropionic acid;
α-hydrazino-α-methyl-β-3-hydroxy-4-bromophenylpropionic acid;
α-hydrazino-α-methyl-β-3-hydroxy-4-fluorophenylpropionic acid;
α-hydrazino-α-methyl-β-3-hydroxy-4-trifluoromethylpropionic acid;
α-hydrazino-α-methyl-β-3-hydroxy-4-ethylphenylpropionic acid;
α-hydrazino-α-methyl-β-2,5-dihydroxyphenylpropionic acid;
α-hydrazino-α-methyl-β-3,4,5-trihydroxyphenylpropionic acid;
α-hydrazino-α-methyl-β-2,4,5-trihydroxyphenylpropionic acid;
α-hydrazino-α-methyl-β-2,3,4-trihydroxyphenylpropionic acid;
α-hydrazino-α-ethyl-β-3-hydroxyphenylpropionic acid;
α-hydrazino-α-ethyl-β-4-hydroxyphenylpropionic acid;

α-hydrazino-α-ethyl-β-3,4-hydroxyphenylpropionic acid;
α-hydrazino-α-ethyl-β-2,3-dihydroxyphenylpropionic acid;
α-hydrazino-α-ethyl-β-2,5-dihydroxyphenylpropionic acid;
α-hydrazino-α-ethyl-β-2,4-dihydroxyphenylpropionic acid;
α-hydrazino-α-ethyl-β-3,4,5-trihydroxyphenylpropionic acid;
α-hydrazino-α-ethyl-β-2,4,5-trihydroxyphenylpropionic acid;
α-hydrazino-α-ethyl-β-2,3,4-trihydroxyphenylpropionic acid;
α-hydrazino-α-propyl-β-3-hydroxyphenylpropionic acid;
α-hydrazino-α-propyl-β-4-hydroxyphenylpropionic acid;
α-hydrazino-α-propyl-β-3,4-hydroxyphenylpropionic acid;
α-hydrazino-α-propyl-β-2,3-dihydroxyphenylpropionic acid;
α-hydrazino-α-propyl-β-2,4-dihydroxyphenylpropionic acid;
α-hydrazino-α-propyl-β-2,5-dihydroxyphenylpropionic acid;
α-hydrazino-α-propyl-β-3,4,5-trihydroxyphenylpropionic acid;
α-hydrazino-α-propyl-β-2,4,5-trihydroxyphenylpropionic acid;
α-hydrazino-α-propyl-β-2,3,4-trihydroxyphenylpropionic acid;
α-hydrazino-α-butyl-β-3-hydroxyphenylpropionic acid;
α-hydrazino-α-butyl-β-4-hydroxyphenylpropionic acid;
α-hydrazino-α-butyl-β-3,4-hydroxyphenylpropionic acid;
α-hydrazino-α-butyl-β-2,3-dihydroxyphenylpropionic acid;
α-hydrazino-α-butyl-β-2,4-dihydroxyphenylpropionic acid;
α-hydrazino-α-butyl-β-2,5-dihydroxyphenylpropionic acid;
α-hydrazino-α-butyl-β-3,4,5-trihydroxyphenylpropionic acid;
α-hydrazino-α-butyl-β-2,4,5-trihydroxyphenylpropionic acid;
α-hydrazino-α-butyl-β-2,3,4-trihydroxyphenylpropionic acid;
α-hydrazino-α-β-dimethyl-β-3-hydroxyphenylpropionic acid;
α-hydrazino-α,β-dimethyl-β-4-hydroxyphenylpropionic acid;
α-hydrazino-α,β-dimethyl-β-3,4-hydroxyphenylpropionic acid;
α-hydrazino-α,β-dimethyl-β-2,3-dihydroxyphenylpropionic acid;
α-hydrazino-α,β-dimethyl-β-2,4-dihydroxyphenylpropionic acid;
α-hydrazino-α,β-dimethyl-β-2,5-dihydroxyphenylpropionic acid;
α-hydrazino-α-β-dimethyl-β-3,4,5-trihydroxyphenylpropionic acid;
α-hydrazino-α-β-dimethyl-β-2,4,5-trihydroxyphenylpropionic acid;
α-hydrazino-α-β-dimethyl-β-2,3,4-trihydroxyphenylpropionic acid;
α-hydrazino-α-ethyl-β-methyl-β-3-hydroxyphenylpropionic acid;
α-hydrazino-α-ethyl-β-methyl-β-4-hydroxyphenylpropionic acid;
α-hydrazino-α-ethyl-β-methyl-β-3,4-hydroxyphenylpropionic acid;
α-hydrazino-α-ethyl-β-methyl-β-2,3-dihydroxyphenylpropionic acid;
α-hydrazino-α-ethyl-β-methyl-β-2,4-dihydroxyphenylpropionic acid;
α-hydrazino-α-ethyl-β-methyl-β-2,5-dihydroxyphenylpropionic acid;
α-hydrazino-α-ethyl-β-methyl-β-2,5-dihydroxyphenylpropionic acid;
α-hydrazino-α-ethyl-β-methyl-3,4,5-trihydroxyphenylpropionic acid;
α-hydrazino-α-ethyl-β-methyl-β-2,4,5-trihydroxyphenylpropionic acid;
α-hydrazino-α-ethyl-β-methyl-β-2,3,4-trihydroxyphenylpropionic acid;
α-hydrazino-α-methyl-β-ethyl-β-3-hydroxyphenylpropionic acid;
α-hydrazino-α-methyl-β-ethyl-β-4-hydroxyphenylpropionic acid;
α-hydrazino-α-methyl-β-ethyl-β-3,4-hydroxyphenylpropionic acid;
α-hydrazino-α-methyl-β-ethyl-β-2,3-dihydroxyphenylpropionic acid;
α-hydrazino-α-methyl-β-ethyl-β-2,5-dihydroxyphenylpropionic acid;
α-hydrazino-α-methyl-β-ethyl-β-2,5-dihydroxyphenylpropionic acid;
α-hydrazino-α-methyl-β-ethyl-β-3,4,5-trihydroxyphenylpropionic acid;
α-hydrazino-α-methyl-β-ethyl-β-2,4,5-trihydroxyphenylpropionic acid;
α-hydrazino-α-methyl-β-ethyl-β-2,3,4-trihydroxyphenylpropionic acid;
$N^2$-isopropylidenyl-α-hydrazino-α-methyl-β-(3,4-dihydroxyphenyl) propionic acid;
$N^2$-isopropyl-α-hydrazino-α-methyl-β-(3,4-dihydroxyphenyl) propionic acid;

as well as the methyl, ethyl, i-propyl, and butyl esters of all these compounds, the lower alkanoyl derivatives of all of them, and the non-toxic salts of these compounds such as the alkali metal and ammonium salts of the carboxy function and the hydrochloride, hydrobromide, sulfate and the like salts of the amino function.

The compounds used in our invention which have α alkyl groups are prepared starting with a ketone of the structure—

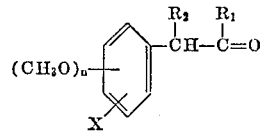

The preparation of such compounds is shown in Flow Sheet A which shows schematically the alternative synthesis possible. It should be noted that when $R_2$ is other than hydrogen, synthesis (B) is preferably used. The starting material can also be a similar compound having a free hydroxyl such as the compounds of the structure—

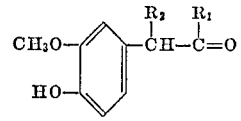

These can be made by the above routes using incompletely methylated starting materials. In some cases such incompletely methylated starting materials are much more cheaply and readily available, as for example, the compounds of the above formula which are readily prepared from vanillin. It should, however, be also noted that it is not advisable to use a starting ketone having all hydroxyls on the phenyl ring free, since the handling of the intermediates becomes experimentally difficult.

FLOW SHEET A

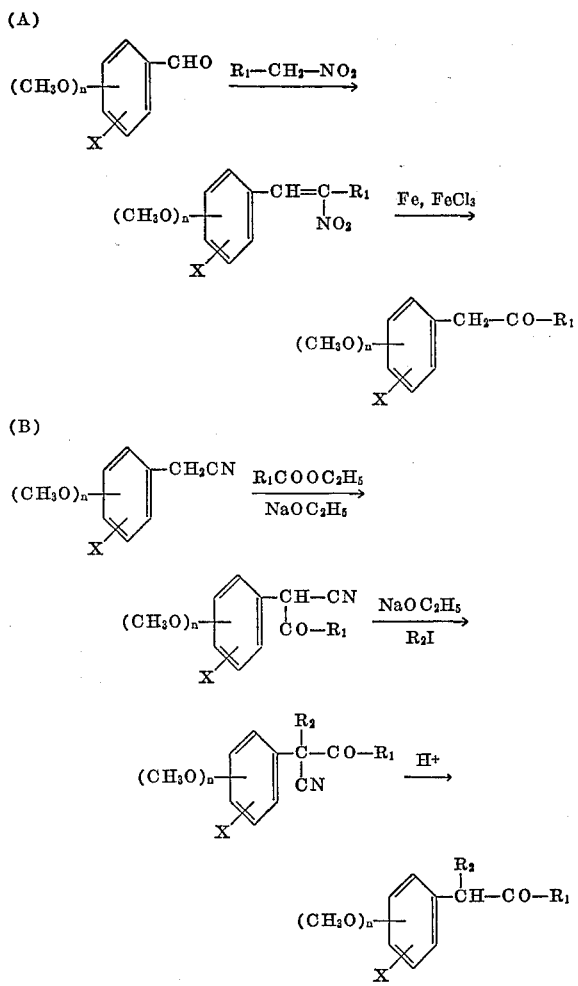

FLOW SHEET B

Synthesis of α-hydrazino acids

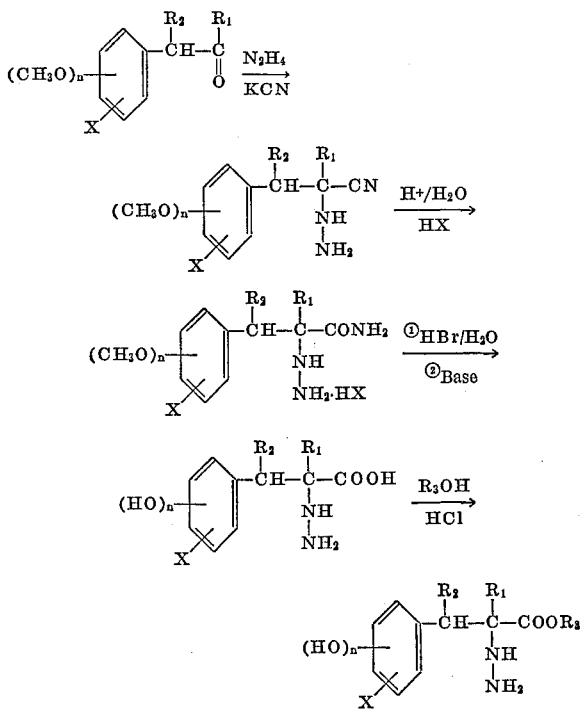

The preparation of the α-alkyl compounds used in our invention is shown schematically in Flow Sheet B. The details of these reactions are to be found in the examples. In general, the synthesis consists of condensation of the starting ketone with hydrazine and potassium cyanide to form a hydrazino nitrile. This, upon hydrolysis with acid, yields a hydrazino amide salt and the treatment of this amide with strong hydrobromic acid simultaneously finishes the hydrolysis to the free acid and dealkylates the ring methoxyl group or groups. The product at this point is an acid salt. The free hydrazino acids are obtained, when desired, from their salts by careful neutralization with a base such as diethylamine, ammonia or strong inorganic base.

Other less preferred routes of synthesis may include the reaction of hydroxylamine sulfate with the corresponding amino acid to form the hydrazino-compound and the reduction of the α-diazo acids prepared by diazotization of the α-amino acids. The compounds for use in our invention which lack the α-alkyl group are prepared by the latter routes, preferably. Several are known in the literature, prepared the action of hydrazine on α-mercapto acids, although the decarboxylase inhibitory property was not known. The best route for their synthesis is probably that using diazotization of the corresponding amino acid in the presence of a halide ion, followed by reaction of the resultant α-halo-acid with hydrazine.

The $N^2$-alkylidenyl derivatives are prepared by reaction of the hydrazine with the appropriate ketone or aldehyde to form the hydrazone. A simple way of carrying out this reaction is to dissolve the compound in the ketone or a solution of the ketone in a mutual solvent. Heat is not always necessary as the hydrazones form quite easily. Catalytic reduction of the hydrazones gives the $N^2$-alkyl products. Alternatively, the $N^2$-alkyl derivatives are prepared by substituting the corresponding alkyl hydrazines for hydrazine in the synthesis of Flow Sheet B.

The carbalkoxy type esters of the hydrazino acids used in our invention are readily prepared by esterification with a lower alkanol in the presence of excess mineral acid such as sulfuric acid, hydrobromic acid, or the like. The esters are especially useful in that one obtains better absorption of the compound in the body and much more prolonged activity with smaller and less frequent dosage. The esters, especially, can be used in the form of non-toxic salts such as the hydrobromide, hydrochloride, sulfate and the like, in which form much higher aqueous solubility can be obtained than with the free acids. These salts are water soluble and are formed in the preparation of the ester, being the first form in which such esters are isolated. When the free hydrazino ester is desired, it is obtained by basification of the salt. Both the salts and the free hydrazino compounds can be used therapeutically.

The acyloxy type of ester among the compounds used in our inventions are also more readily and completely absorbed in the body and give more prolonged activity with smaller and less frequent dosages. They are the products of the acylation of the ring hydroxyls with a lower alkanoic anhydride or an alkanoyl halide. Acylation may produce substitution not only on the ring hydroxyls but also on the hydrazino group. Such O, N polyacyl compounds are produced by the use of an excess of acylating agent in the presence of an organic base such as pyridine, picoline, dimethylaniline and the like. Conveniently, the base can be used as the reaction solvent, although it also can be an adjuvant to reaction in an inert solvent, acting only as an acid binding agent. The acyloxy compounds having unacylated hydrazino groups are prepared by a modified Schotten-Baumann reaction in which there is used just enough aqueous caustic to neutralize 80–100% of the acid and potential acid groups (acyl anhydrides or chlorides) present in the reaction mixture. The usage is calculated to end the reaction at a pH of 6–7, where the acyloxy hydrazinophenylpropionic acid will precipitate. The acylating agents include acetic anhydride, propionic anhydride, butyric anhydride, acetyl chloride, propionyl chloride and the like. The introduction of formyl groups is carried out by use of formyl acetic anhydride, prepared by the procedure of Huffman, J. Org. Chem. 23, 728 (1958).

In the inhibition of decarboxylase in vitro and in vivo, the α-hydrazino acids of our invention are many times more active then the corresponding α-amino acid. For example, α-hydrazino-α-methyl-3,4-dihydroxy-phenylpropionic acid is a thousand times more active than α-methyl-3,4-dihydroxyphenylalanine in vitro. In vivo, these α-hydrazino acids are also far more active, the above α-hydrazino-α-methyl-3,4-dihydroxyphenylpropionic acid being at least 50 times more active than the corresponding amino acid.

In their use in vivo, the hydrazino acids may be given orally or parenterally. Dosages for oral administration may vary from 0.1 to 100 mg. per kg. per day. For oral administration to humans, the dosage range appears to be 0.01 to 0.5 g. per day, preferably 0.1 to 0.2 g. per day, usually in frequent small doses. The esters of both types, because their absorption by the organism appears to be greater, have a lower preferred oral dosage range, of the order of 0.01 to 0.2 g. per day, and may be given in less frequent larger doses. These compounds of our invention can be mixed with any of the conventional ingredients for tablets or with any of the conventional carriers for parenteral application, alone or with other compounds, in combination to form or to potentiate antihypertensive compositions, as described above. They can also be used in formulations for other therapy where the inhibition of certain amino acid decarboxylases is desirable (i.e. allergic, carcinoid).

Our invention can be illustrated by the following examples:

EXAMPLE 1

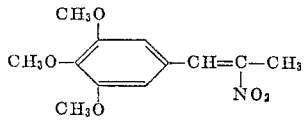

To a solution of 74.3 g. of 3,4,5-trimethoxybenzaldehyde in 121 ml. of toluene is added 50.1 g. of nitroethane, 3.03 ml. of n-butylamine and 3.69 ml. of glacial acetic acid. The mixture is refluxed and the water of reaction is steadily azeotropically removed by distillation. After the theoretical amount of water is distilled out, distillation is continued to remove excess reactants. The last trace of excess reactants is then removed at room temperature under a vacuum. The product is then triturated with a hydrocarbon solvent such as Skellysolve B and is thus obtained in a crystalline state. In general, however, it is preferred to dissolve the residue directly in toluene for use in the next step (see Example 2), without isolating the 1-(2-nitropropen-1-yl)-3,4,5-trimethoxybenzene.

When the above procedure is followed and a quantity of nitropropane, nitrobutane, or nitropentane is used, the correspondingly substituted nitroalkenyl-trimethoxybenzene is obtained, namely 1-(2-nitrobuten-1-yl)-, 1-(2-nitropenten-1-yl)- and 1-(2-nitrohexen-1-yl)-3,4,5-trimethoxybenzene. Similarly, when 2,3,4-trimethoxybenzaldehyde and 2,4,5-trimethoxybenzaldehyde are substituted for the 3,4,5-trimethoxybenzaldehyde in the above procedure, the corresponding trimethoxy-isomer is obtained. Such substitution can be done whether the other reagent is nitroethane, nitropropane, nitrobutane or the like.

EXAMPLE 2

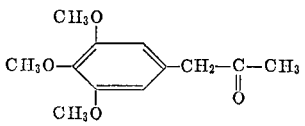

To a mixture of 137.4 g. of 40-mesh iron, 2.75 g. of hydrated ferric chloride and 172 ml. of water, there is added 96.0 g. of 1-(2-nitropropen-1-yl)-3,4,5-trimethoxybenzene (the product of Example 1) dissolved in 50 ml. of toluene. The mixture is heated to reflux and 248 ml. of concentrated hydrochloric acid is added drop-wise at a rate calculated to keep the mixture refluxing vigorously. After the hydrochloric acid is all added, the refluxing is continued by the application of heat for several hours. A siliceous filter aid is then added to the cooled reaction mixture and the material is removed by filtration. The filter cake is washed four times, each time with 90 ml. of benzene. The organic layer is then separated from the filtrate. The water layer is acidified to a pH of 2 and extracted three times with 90 ml. portions of benzene. These extracts are then combined with the organic solvent layer and the combined organic phase is extracted four times with 100 ml. portions of water. It is then stirred for an hour with 230 ml. of 10% sodium bisulfite solution. The organic solvent phase is then separated, washed seven times with 100 ml. portions of water and dried over magnesium sulfate. Evaporation of the solvent gives 1-(3,4,5-trimethoxyphenyl)-2-propanone in the form of an oil.

Similarly, when the corresponding 1-(2-nitrobuten-1-yl)-, 1-(2-nitropenten-1-yl)- or 1-(2-nitrohexen-1-yl)-3,4,5-trimethoxybenzene prepared in Example 1 by using nitropropane, nitrobutane or nitropentane, is substituted for the 1-(2-nitropropen-1-yl)-3,4,5-trimethoxybenzene in equivalent quantities, one obtains 1-(3,4,5-trimethoxyphenyl)-2-butanone, -2-pentanone, and -2-hexanone.

EXAMPLE 3

A solution of 88.5 g. of 3,4-dimethoxyphenylacetonitrile in 198 ml. of ethyl propionate is added to a freshly prepared solution of sodium ethoxide in ethanol prepared by dissolving 34.5 g. of sodium metal in 400 ml. of absolute ethanol containing 2% benzene. This solution is refluxed for four hours. The mixture is stirred while cooling in an ice bath for two hours and the filtrate is washed with 200 ml. of ethyl acetate and 200 ml. of ether. The resulting sodium salt of propionyl-(3,4-dimethoxyphenyl)acetonitrile is dissolved in 1200 ml. of water and cooled in an ice bath to 10° C. To this solution is added 115 ml. of glacial acetic acid over a 30-minute period. The mixture is extracted with water and the ether layer washed until neutral. The ether layer is dried and concentrated in vacuo to form 1-cyano-1-(3,4-dimethoxyphenyl)-2-butanone as a viscous orange oil.

When in the above procedure ethyl butyrate or ethyl valerate are used in place of the propionic acid, the corresponding 1-cyano-1-(3,4-dimethoxyphenyl)-2-pentanone and 1-cyano-1-(3,4-dimethoxyphenyl)-2-hexanone are obtained.

EXAMPLE 4

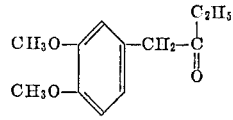

1-cyano-1-(3,4-dimethoxyphenyl)-2-butanone (the product of Example 3) weighing about 99 g. (0.425 mole) is added with stirring over a one hour period to a solution of 250 ml. of concentrated (98%) sulfuric acid and 60 ml. of water at a temperature of 0 to 5° C. The mixture is heated at 80° C. for 10 minutes. The solution is added slowly. The mixture is then heated on a steam bath at 90° C. for three hours. An oil separates upon cooling. This mixture is extracted with four 200 ml. portions followed by two 100 ml. portions of ether. The ether layers are combined and washed with 100 ml. of 5% aqueous solution of sodium bicarbonate and 100 ml. of water. The ether layer is dried and concentrated until liquid 1-(3,4-dimethoxyphenyl)-2-butanone is obtained.

When any of the other products of Example 3 are substituted in the above procedure, the corresponding 1-(3,4-dimethoxyphenyl)-2-pentanone and -2-hexanone are obtained.

EXAMPLE 5

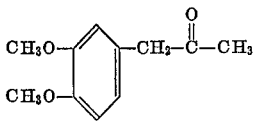

The procedures of Examples 1 and 2 are followed using an equivalent quantity of 3,4-dimethoxybenzaldehyde in place of the trimethoxybenzaldehyde to give 1-(3,4-dimethoxyphenyl)-2-propanone, which is also preparable by the procedure of Examples 17, 18 and 19 of U.S. 2,868,818, where it is named methyl-(3,4-dimethoxybenzyl)-ketone. When 2,3-dimethoxybenzaldehyde, 2,4-dimethoxybenzaldehyde, 3,5-dimethoxybenzaldehyde, 3-methoxy-4-methylbenzaldehyde, 3-methoxy-4-chlorobenzaldehyde, 3-methoxy-4-bromobenzaldehyde, 3-methoxy-4-fluorobenzaldehyde, 3-methoxy-4-iodobenzaldehyde, 3-methoxy-4-trifluoromethylbenzaldehyde or 3-methoxy-4-ethylbenzaldehyde is substituted for the 3,4-isomer, the corresponding 1-(2,3-, 2,4- or 3,5-dimethoxy or 3-hydroxy-4-methyl, ethyl, chloro, bromo, fluoro, iodo or trifluoromethyl phenyl)-2 propanone is obtained. Similarly, when equivalent quantities of nitropropane, nitrobutane and nitropentane are substituted for the nitroethane in the procedure of Example 1, the corresponding 1-(3,4-dimethoxyphenyl)-2-butanone, -2-pentanone and -2-hexanone are obtained after the procedure of Example 2 has been carried out on the product.

EXAMPLE 6

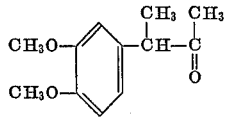

To 58.3 g. of 1-(3,4-dimethoxyphenyl)-2-propanone (the product of Example 5) there is added, with vigorous stirring in an atmosphere of nitrogen, 32.5 g. of sodium methylate. To this mixture is then added with cooling and efficient refluxing condensers, 127.8 g. of methyl iodide. The reaction mixture is heated on a steam bath for one hour and then stirred at room temperature overnight. The methyl iodide is removed by distillation and 100 ml. of water is added. The product is extracted with ether and the ether solution is washed with aqueous sodium thiosulfate, water, and saturated sodium chloride solution and then dried over magnesium sulfate. The ether is removed by evaporation and the product is distilled to yield the 3-(3,4-dimethoxyphenyl)-2-butanone.

When ethyl iodide, propyl iodide or butyl iodide is used in place of methyl iodide, the corresponding 3-(3,4-dimethoxyphenyl) - 2 - pentanone, -2-hexanone, or -2-heptanone is obtained.

Similarly, when 1-(2,3,4-trimethoxyphenyl) - 2 - propanone, or its 3,4,5- or 2,4,5-trimethoxy isomer, is substituted for the 3,4-dimethoxyphenyl compound above, the corresponding 1-(2,3,4-trimethoxyphenyl) - 2 - propanone, 1-(3,4,5-trimethoxyphenyl)-2-propanone or 1-(2,4,5-trimethoxyphenyl)-2-propanone is obtained.

EXAMPLE 7

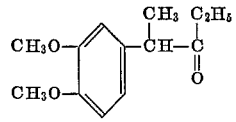

The product of Example 4 is used in the procedure of Example 6 in place of the product of Example 5. The resulting product is 2-(3,4-dimethoxyphenyl)-3-pentanone, having the above structure. When the other cyano ketones described in Example 4 are substituted for the product of Example 2 in the above procedure, the corresponding 2 - (3,4 - dimethoxyphenyl) - 3 - hexanone and 2-(3,4-dimethoxyphenyl)-3-heptanone are obtained.

EXAMPLE 8

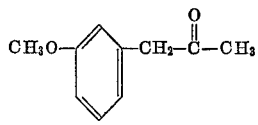

The procedures of Examples 1 and 2 are followed using an equivalent quantity of m-methoxybenzaldehyde in place of the trimethoxybenzaldehyde. The product, 1-(3-methoxyphenyl)-2-propanone, is the same product as that formed by Examples 1, 2 and 3 of U.S. 2,868,818. When paramethoxybenzaldehyde is used in place of the metamethoxybenzaldehyde, the corresponding paramethoxyphenyl acetone is obtained. When an equivalent quantity of nitropropane, nitrobutane, or nitropentane is substituted for the nitroethane in the procedure of Example 1, the corresponding 1-(methoxyphenyl) - 2 - butanone, -2-pentanone, and -2-hexanone are obtained.

EXAMPLE 9

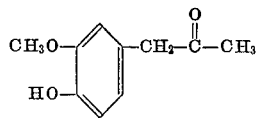

The procedures of Examples 1 and 2 are followed using an equivalent quantity of vanillin in place of the trimethoxybenzaldehyde used in Example 1 to give 1-(4-hydroxy-3-methoxyphenyl)-2-propanone. When an equivalent quantity of nitropropane, nitropentane, or nitrobutane is substituted for the nitroethane used in the procedure of Example 1, there are obtained the corresponding 1-(4-hydroxy-3-methoxyphenyl)-2-butanone, -2-pentanone and -2-hexanone.

EXAMPLE 10

CH₃O—⟨ ⟩—CH(CH₃)—C(=O)—C₂H₅
  |
CH₃O

The procedures of Examples 3, 4 and 7 are followed substituting an equivalent quantity of 3,4,5-trimethoxyphenyl acetonitrile for the dimethoxyphenyl acetonitrile used in Example 3 to give 2-(3,4,5-trimethoxyphenyl)-3-pentanone. Similarly, when 2,4,5 - trimethoxyphenyl acetonitrile or its 2,3,4 isomer is used in place of the 3,4,5 isomer, the corresponding 1 - (2,4,5 or 2,3,4 - trimethoxyphenyl)-2-butanone is obtained from the procedure of Example 4 and the corresponding 2-(2,4,5 or 2,3,4-trimethoxyphenyl)-3-pentanone is obtained when this is used in the procedure of Example 6.

EXAMPLE 11

CH₃O—⟨ ⟩—CH₂—C(CH₃)(NH-NH₂)—CN
  |
HO

A mixture of 59.5 g. of the product of Example 9, 1.85 liters of benzene and 1 kg. of potassium bisulfite in 200 liters of water is stirred at room temperature for two hours. The precipitated bisulfite addition product of the ketone is isolated by filtration and washed with isopropanol and then with ether. Five hundred grams of the adduct is mixed with 119.5 g. of potassium cyanide, 292 ml. of 85% hydrazine hydrate and 910 ml. of water. The mixture is stirred overnight at room temperature after which the product is isolated by filtration. The product is washed three times with 250 ml. portions of water and then three times with 230 ml. portions of ether. It is then air dried and vacuum dried at room temperature.

EXAMPLE 12

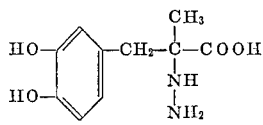

50 cc. of concentrated hydrochloric acid is saturated with hydrochloride gas at −10° C. To the solution is then added 2.5 g. of the product of Example 11, slowly with vigorous stirring. The mixture is allowed to stir overnight while warming at room temperature gradually. It is then concentrated in vacuo to a syrup. To the residual syrup is added 100 ml. of 48% hydrobromic acid. The reaction vessel is purged with nitrogen and the reaction mixture is then refluxed for three hours after which it is concentrated in vacuo to a mixture of a syrup and a solid. The residue is taken up in sufficient water to form a clear solution. Activated charcoal is added and the mixture is heated to boiling and filtered. The filtrate is concentrated to dryness in vacuo and the residue is taken up in 25 cc. of ethanol. The residual ammonium bromide is removed by filtration and to the filtrate there is added sufficient diethylamine to change the pH to 6.4. The mixture is warmed to 60° C. and then cooled to room temperature. It is then allowed to stand overnight to effect complete crystallization. It is then cooled to 0° and the product is isolated by filtration, washed with methanol and air dried. The product (α-hydrazino-α-methyl-β-(3,4-dihydroxyphenyl)-propionic acid) is recrystallized once from water using a proportion of 15 cc. water per gram of product.

When the procedures of Examples 11 and 12 are followed using an equivalent quantity of the 1-(3,4-dimethoxyphenyl)-2-propanone product of Example 5 in place of the product of Example 9 in the procedure of Example 11, the same product is obtained. Similarly, when the other products of Example 5 are substituted for the product of Example 9 in equivalent quantities in the procedure of Example 11, one obtains after following the procedure of Example 12 on the product α-hydrazino-α-methyl-β-(2,3-, 2,4- or 3,5 dimethoxy or 3-hydroxy-4-methyl, ethyl, chloro, bromo, fluoro, iodo, or trifluoromethylphenyl)-propionic acid.

EXAMPLE 13

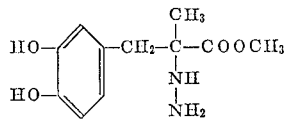

A suspension of 25 g. of α-hydrazino-α-methyl-β-(3,4-dihydroxyphenyl) propionic acid (the product of Example 12) in 250 ml. of anhydrous methanol is saturated with hydrogen chloride while being held at 10–20° C. The mixture is then refluxed three hours after which it is allowed to stand for eighteen hours. The solvent is removed under a vacuum and the residue is redissolved in 50 ml. of methanol under nitrogen. The methanol is then removed under a vacuum. This addition of methanol is twice repeated. The resulting hydrochloride salt of the methyl ester is then taken up in 50 ml. of water at 50° C. The solution is filtered and the pH of the filtrate is adjusted to 8.5 with concentrated ammonium ion keeping the mixture under nitrogen and at 5–10° C. The mixture is then allowed to stand for six hours at 5° under nitrogen after which it is filtered and the isolated methyl ester of the above acid is washed three times with 15 ml. of water at 0° C. and then dried in a vacuum.

When ethanol, isopropanol and butanol are substituted for the methanol in the above procedure, the corresponding ethyl and i-propyl butyl esters are obtained.

EXAMPLE 14

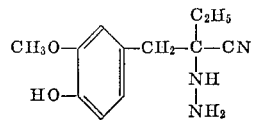

523 g. of 1-(4-hydroxy-3-methoxyphenyl)-2-butanone is mixed with 119.5 g. of potassium cyanide, 292 ml. of 85% hydrazine hydrate and 910 ml. of water. The mixture is stirred at room temperature until the reaction is substantially complete. The product, α-hydrazino-α-ethyl-β-(4-hydroxy-3-methoxyphenyl) propionitrile, is isolated by filtration, washed three times with 260 ml. of water, then three times with 230 ml. of ether and air dried.

When, in place of the 1-(4-hydroxy-3-methoxy-phenyl)-2-butanone, there is used in the above procedure an equivalent quantity of 1-(4-hydroxy-3-methoxyphenyl)-2-pentanone or 1-(4-hydroxy-3-methoxyphenyl)-2-hexanone (prepared in Example 9) the corresponding α-propyl and α-butyl nitriles are obtained.

EXAMPLE 15

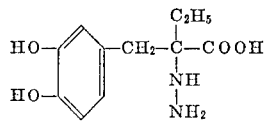

To 50 cc. of concentrated hydrochloric acid saturated with hydrogen chloride at 10° C. there is added slowly with vigorous stirring 2,5 g. of α-hydrazino-α-ethyl-β-(4-hydroxy-3-methoxyphenyl)-propionitrile (the product of Example 14). The reaction mixture is stirred in a closed pressure vessel while being allowed to warm to room temperature. It is then stirred at room temperature until hydrolysis is substantially completed. The reaction mixture is then concentrated in vacuo and to the residue is added 100 ml. of 48% hydrobromic acid. The reaction vessel is purged with nitrogen and the mixture is then refluxed until dealkylation and hydrolysis are substantially completed. The mixture is again concentrated in vacuo and the residue is taken up in sufficient water to effect complete solution. Activated charcoal is added and the mixture is filtered hot. The filtrate is concentrated to dryness in vacuo and the residue is taken up in 25 cc. of ethanol. The solution is filtered and the pH of the filtrate is adjusted to 6.4 with diethylamine. The mixture is then warmed to 60° C. and cooled slowly to room temperature. After standing overnight, it is then cooled to 0° and filtered. The product, α-hydrazino-α-ethyl-β-(3,4-dihydroxyphenyl) propionic acid, is washed with methanol and air dried. It can be recrystallized from water.

When an equivalent quantity of the corresponding α-propyl and α-butyl hydrazino nitriles prepared in Example 14 are substituted for the product of Example 14, the corresponding α-hydrazino-α-propyl and α-hydrazino-α-butyl β-(3,4-dihydroxyphenyl) propionic acids are obtained.

When the above products are substituted in the procedure of Example 13 for the product of Example 12, there are obtained the corresponding methyl, ethyl, i-propyl and butyl esters.

EXAMPLE 16

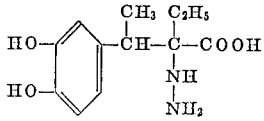

The procedures of Examples 14 and 15 are followed using 2-(3,4-dimethoxyphenyl)-3-pentanone (the product of Example 7) in equivalent quantities in place of the starting material used in Example 14 to give α-hydrazino-α-ethyl-β-methyl-β-(3,4-dihydroxyphenyl)propionic acid. When, in place of the product of Example 7, there is used an equivalent quantity of the product of Example 6 as a starting material, the corresponding α-hydrazino-α,β-dimethyl-β-(3,4-dihydroxyphenyl) propionic acid is obtained.

When the procedure of Example 13 is followed on either of these compounds, the corresponding methyl, ethyl, i-propyl and butyl esters are obtained.

EXAMPLE 17

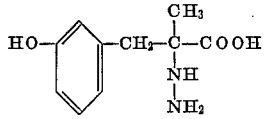

The procedures of Examples 11 and 12 are followed using an equivalent quantity of 1-(3-methoxyphenyl)-2-propanone (the product of Example 8) in place of the product of Example 9 to yield α-hydrazino-α-methyl-β-3-hydroxyphenylpropionic acid. When the corresponding p-methoxyphenyl ketone is used in place of the product of the meta isomer, one obtains the corresponding α-hydrazino-α-methyl-β-(4-hydroxyphenyl) propionic acid. Similarly, when the corresponding 1-(3-methoxyphenyl)-2-butanone, -2-pentanone and -2-hexanone (as prepared in Example 8) are substituted in equivalent quantities for the 1-(3-methoxyphenyl)-2-propanone above in the procedures of Examples 11 and 12, one obtains the corresponding α-hydrazino-α-ethyl, α-hydrazino-α-propyl and α-hydrazino α-butyl-β-(3-hydroxyphenyl) propionic acids.

When any of the above products are substituted for the product of Example 12 in the esterification procedure of Example 13, the corresponding methyl, ethyl, i-propyl and butyl esters are obtained.

EXAMPLE 18

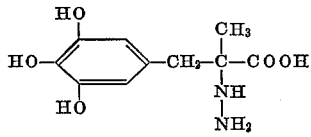

The procedure of Examples 11 and 12 is followed using an equivalent quantity of the product of Example 2 in place of the product of Example 9 to yield α-hydrazino-α-methyl-β-(3,4,5-trihydroxyphenyl) propionic acid. When the corresponding 2,4,5- and 2,3,4-trimethoxyphenyl isomers (also prepared in Example 2) are substituted for the main product of Example 2, there is obtained the corresponding α-hydrazino-α-methyl-β-(2,4,5 and 2,3,4-trimethoxyphenyl) propionic acids. When any of the above acids are substituted in the procedure of Example 13, in equivalent quantities, for the product of Example 12, there are obtained the corresponding methyl, ethyl, i-propyl and butyl esters.

EXAMPLE 19

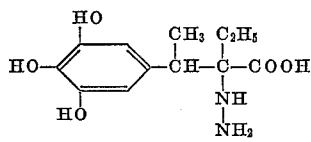

The procedure of Examples 14 and 15 is followed using an equivalent quantity of 2-(3,4,5-trimethoxyphenyl)-3-pentanone (the produce of Example 10) in place of the 1-(4-hydroxy-3-methoxyphenyl)-2-butanone used in Example 14 to yield α-hydrazino-α-ethyl-β-methyl-β-(3,4,5-trihydroxyphenyl) propionic acid. When the isomeric 2,4,5 and 2,3,4-trimethoxyphenyl ketones obtained in Example 10 are substituted for the 3,4,5-trimethoxyphenyl ketone, the corresponding α-hydrazino-α-ethyl-β-methyl-β-(2,3,4 and 2,4,5-trihydroxyphenyl) propionic acids are obtained. When any of the above acids are substituted in equivalent quantities for the product of Example 12 in the procedure of Example 13, the corresponding methyl, ethyl, i-propyl and butyl esters are obtained.

EXAMPLE 20

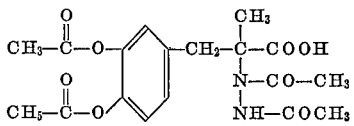

A mixture of 26.8 g. of α-hydrazino-α-methyl-β-(3,4-dihydroxyphenyl) propionic acid (the product of Example 12) 100 ml. of acetic anhydride, and 75 ml. of pyridine is purged with nitrogen and then heated under nitrogen to 90° for 3–4 hours. The mixture is then allowed to stand overnight at room temperature and then is concentrated on a steam bath in vacuo. The residue is stirred with ice water and the mixture is acidified strongly with hydrochloric acid. The polyacetyl compound (most likely the tetraacetyl compound of the above formula) is isolated by filtration, washed with ice water and dried in vacuo.

When the products of Examples 15, 16, 17, 18 and 19 are substituted for the product of Example 12 in equivalent quantity and the amount of acetic anhydride is increased or decreased equivalently depending on the number of hydroxyls present, the corresponding acyl products are obtained.

When formyl acetic anhydride is substituted for the acetic anhydride, the product is the formylated phenyl hydrazino propionic acid.

EXAMPLE 21

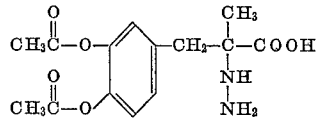

A mixture of 10 ml. of water and 5.73 g. of sodium hydroxide is boiled and then cooled to room temperature. To the solution is added 10.7 g. of the product of Example 12 and 50 g. of ice water. While stirring the solution vigorously, there is added 11.13 ml. of acetic anhydride. The mixture is stirred at 0° for several hours and then filtered. The product is washed with 9:1 mixture of isopropanol and water and recrystallized from a 4:1 isopropanol-water mixture with a hot clarification.

When propionic anhydride is used in place of acetic anhydried in the above procedure, the corresponding propionly product is obtained. When the products of Examples 15, 16, 17, 18 and 19 are substituted in equivalent quantity for the product of Example 12 and the amount of acetic anhydride is adjusted equivalent to the number of hydroxyls to be acylated, the corresponding acetyl products are obtained.

EXAMPLE 22

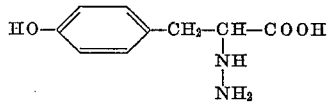

90.6 grams (0.5 mole) 1-tyrosine is suspended in 1 liter water and heated to 90° C. The source of heat is removed and 380 cc. acetic anhydride is added dropwise over a period of 35 minutes. The temperature drops to 860° C. and a solution forms. The solution is concentrated in vacuo to dryness. The residue (a gum) is dissolved in a warm solution of 60 g. of sodium hydroxide in 280 cc. water. Dimethylsulfate (82 cc.) is added dropwise over a period of 20 minutes at 55–65° C. (slight heat of reaction). Near the end of the addition, it is necessary to add 100 cc. 2.5 N sodium hydroxide in portions to maintain alkalinity. The solution is heated to 90° and held at 90–95° for 20 minutes. After cooling to 10°, the solution is acidified to Congo Red with 70 cc. concentrated hydrochloric acid. The precipitated gum is extracted with 200 + 2× 100 cc. chloroform. The combined extracts are dried over anhydrous magnesium sulfate, then chilled at 0° for 2 hours. The crystals are collected, washed with 25 cc. cold chloroform, and dried in vacuo at 50–60°.

62 grams (0.262 mole) N-acetyl-p-methoxy-1-phenylalanine thus prepared is refluxed in 310 cc. of 1:1 concentrated hydrochloric acid-water for 2 hours. The solution is cooled to 5°, the crystals collected, washed three times with 20 cc. of cold 1:1 concentrated hydrochloric acid-water, and dried in vacuo at 60°. 42 grams of the hydrochloride is dissolved in 420 cc. hot (78°) water and filtered from some insolubles. 17 cc. Concentrated ammonium hydroxide is added to the hot solution. The precipitated amino acid is chilled to 2°, the crystals collected, washed three times with 30 cc. of ice water, and air dried at 50°.

The p-methoxy-1-phenylalanine so prepared (17.0 g. or 0.087 mole) is dissolved in 145 cc. of 3 N sulfuric acid and chilled to −10°. Potassium bromide (35 g., 0.294 mole) is added and stirring is continued until all is dissolved. The solution is cooled to −10°. A solution of 7.85 g. (0.114 mole) of sodium nitrite in 11 cc. water is added dropwise to the slurry at −10° to −5° over a period of 5½ hours. During this time the slurry changes from white to pale yellow. After the addition, the mixture is stirred for ½ hour at 0°. The crystals are collected, washed twice with 20 cc. of cold water, and dried in vacuo. The product (18 g.) is dissolved in 33 cc. hot (80°) xylene, then allowed to cool slowly to room temperature while inducing the crystallization by scratching. After chilling overnight at 5°, the crystals are collected, washed three times with 4 cc. of cold xylene, and dried in vacuo.

A solution of 6.3 (0.0244 mole) of the α-bromo-β-(p-methoxyphenyl) propionic acid thus formed in 12.6 g. ethanol is added dropwise over a period of 15 minutes to a solution of 4.85 g. of 80% hydrazine hydrate in 16.4 g. ethanol. The mixture is refluxed for 1½ hours, then cooled to 5°. The crystals are collected, washed with 10 cc. cold ethanol, then six times with 5 cc. of ice water, and dried in vacuo. The product, α-hydrazino-β-(p-methoxyphenyl) propionic acid is refluxed in 100 ml. of 48% hydrobromic acid under nitrogen for three hours. The mixture is concentrated in vacuo and the residue is taken up in water. The solution is boiled with activated charcoal and filtered. The filtrate is evaporated in vacuo and the residue is taken up in 25 cc. of ethanol. The solution, after clarification, is treated with diethylamine to a pH about 6.5, warmed and then cooled to 0°. The product is filtered, washed and air-dried. It can be recrystallized from water. It is 1-α-hydrazino-β-(4-hydroxyphenyl) propionic acid.

Using the same procedure, but starting with other substituted amino acids, such as m-tyrosine and 3,4-dihydroxyphenylalanine, the correspondingly substituted α-hydrazino acids, such as α-hydrazino-β-(3-hydroxyphenyl) (N-3,4-dihydroxy phenyl) propionic acids, are obtained.

When these compounds are used in the procedure of Example 13, the corresponding esters are obtained, and in the procedures of Examples 20 and 21, the corresponding acyl derivatives are obtained.

EXAMPLE 23

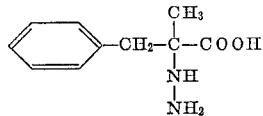

A solution of 9.04 g. of α-methylphenylalanine in 10.5 g. of sodium hydroxide and 76 ml. of water is cooled to 0° C. A solution of 11.4 g. of hydrazine-O-sulfonic acid in 50.6 ml. of water is made up by chilling the water to 0° C. and adding the hydroxylamine-O-sulfonic acid. The latter solution is then gradually added, cold, with stirring, to the first solution. The mixture is then heated to 70–75° C. for 40 minutes. It is then cooled and acidified to pH 2.0 with 6 N HCl. A small amount of cloudiness is removed by an ether extraction. The aqueous raffinate is basified to pH 6.4 with NH4OH. It is then concentrated in vacuo to about half volume and cooled. The solid product is separated by filtration, washed with 30 ml. of water and dried. A second crop is obtained by chilling the mother liquor and washing.

In order to separate the hydrazino compound, the benzaldehyde hydrazone is prepared by dissolving 0.845 g. of the crude product in 84.5 ml. of boiling water. A solution of 0.4225 g. of benzaldehyde in 25.35 ml. of methanol is then added. A precipitate forms immediately. The mixture is cooled and filtered. The product is washed twice with 8 ml. of water and once with 8 ml. of methanol. The procedure is repeated with other batches of the crude hydrazino acid.

The benzal compound thus formed, 750 mg., is dissolved in 17 ml. of 2.5 N HCl at reflux. The refluxing is then continued for 1 hour. About one-half the volume is then distilled out, replaced with 25 ml. of water and again distilled out, in order to remove benzaldehyde. At about 10 ml. volume, the mixture is clarified and the filtrate is concentrated in vacuo to dryness and pumped overnight to remove excess HCl. The residue is taken up in 15–20 ml. of 2BA ethanol and neutralized to pH 6.4 with diethylamine. A precipitate forms. The mixture is heated to the boil and filtered hot. The product, a white solid gives a negative test for halogen and analyzes correctly for α-methyl-α-hydrazino-β-phenyl-propionic acid.

EXAMPLE 24

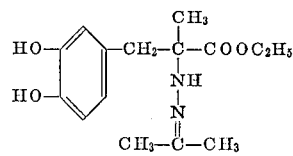

The ethyl ester of α-methyl-α-hydrazino-β-(3,4-dihydroxyphenyl) propionic acid, prepared in Example 13 is dissolved in hot acetone. A precipitate forms immediately. This is filtered, washed with acetone and dried. It is the N²-isopropylidenyl compound of the above structure.

Similarly, when methyl ethyl ketone is used in place of acetone, the corresponding hydrazone is formed.

EXAMPLE 25

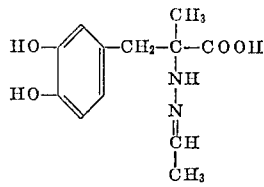

To a hot solution of the product of Example 12 in a minimum amount of water is added aqueous acetaldehyde. The mixture is refluxed a short time and cooled. The product is filtered, washed and dried.

Similarly, when other aldehydes such as formaldehyde, propionaldehyde and butyraldehyde are used, the corresponding hydrazones are formed.

EXAMPLE 26

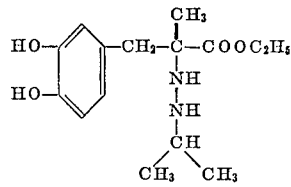

The product of Example 24 is dissolved in acetone and alcohol and charged to an autoclave together with platinum oxide catalyst. Hydrogen is run in to 50 p.s.i. pressure and the autoclave is shaken at room temperature overnight. The mixture is then filtered and the filtrate is evaporated to dryness. The residual oil is dissolved in absolute ether and dry HCl is passed through the solution.

The hydrochloride separates as an oil which crystallizes on standing. This is isolated by filtration and dried.

The free acid can be obtained by saponification of the ester in aqueous acid solution.

EXAMPLE 27

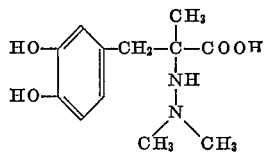

The procedure of Examples 11 and 12 are followed using an equivalent quantity of N,N - dimethylhydrazine in place of the hydrazine hydrates to give the above α-$N^2$,$N^2$-dimethylhydrazino-α-methyl - β - (3,4-dihydroxyphenyl)propionic acid.

Similarly, when N - methylhydrazine, N-propylhydrazine, N-butylhydrazine, and N,N-diethyl-hydrazine are used in place of the hydrazine hydrate, the correspondingly substituted hydrazino acids are obtained.

EXAMPLE 28

In vivo test for decarboxylase inhibition

Compounds are assayed for the inhibition in vivo of mammalian decarboxylase by the following procedure, based on the prevention of the formation of serotonin. Groups of 3 to 5 mice each, pretreated 16 hours earlier with a monoamine oxidase inhibitor (phenylisopropylhydrazine, 10 mg./kg. I.P.) are given a combined dose of the inhibitor being tested (when given I.P.) and 100 mg./kg. I.P. of 5-hydroxytryptophane. Oral doses are administered separately 30 minutes prior to the 5-hydroxytryptophane. Forty-five minutes after administration of the 5-hydrdoxytryptophane, the mice are sacrificed by decapitation. The kidneys of each group are pooled, homogenized in water with all glass homogenizers and assayed for serotonin by the method of Udenfriend et al. ("Methods of Biochemical Analysis," volume VI, 1958, Interscience Publishers, N.Y.). The results are expressed in terms of percent inhibition of Serotonin in the kidneys as compared to a control group similarly treated except that no inhibitor is administered. To test oral administration, the same procedure is followed except that the dose of inhibitor is administered orally 30 minutes before the 5-hydroxytrypotphane is injected intraperitoneally.

The results with a number of representative compounds are shown in Table I.

TABLE I

| Compounds | I.P. dose, mg./kg. | P.O. dose, mg./kg. | Percent inhibition |
|---|---|---|---|
| DL-α-hydrazino-α-methyl-β-phenyl-propionic acid. | 6.5 | | 71 |
| | 25.0 | | 77 |
| DL-α-hydrazino-α-methyl-β-(3,4-dihydroxyphenyl) propionic acid. | 0.07 | | 50 |
| | | 0.64 | 50 |
| DL-α-hydrazino-α-methyl-β-(3,4-dihydroxyphenyl) propionic acid ethyl ester. | 100 | | 97 |
| | | 100 | 91 |
| DL-α-hydrazino-β-(3,4-dihydroxyphenyl)propionic acid. | 0.1 | | 62 |
| DL-α-hydrazino-α-methyl-β-(3-methoxy-4-hydroxyphenyl) propionic acid. | 2.5 | | 50 |
| DL-α-$N^2$-isopropylidenyl-hydrazino-α-methyl-β-(3,4-dihydroxyphenyl) propionic acid ethyl ester. | 3.0 | | 71 |
| | | 30 | 54 |
| | | 10 | 48 |

EXAMPLE 29

Depression of blood pressure in hypotensive rats

Rats are made hypertensive by surgery during immaturity. One kidney is removed and the vascular supply to the contralateral kidney is compromised. The rats are allowed to grow to maturity and then screened several times to determine the severity of their hypertension. Only animals with systolic pressure (tensometer technique) of 160 mm. or more are used for testing.

Each day of the test the animals are weighed and their control blood pressures are determined. Drugs are administered (intraperitoneally unless otherwise specified) and pressures are determined again two hours later. The drugs are administered in several forms. Some are solubilized in dilute HCl and back titrated to near neutrality. Others, because of instability and insolubility, are administered as suspensions in carboxymethylcellulose, and this, unless otherwise specified, is standard practice.

Where a compound is judged to be active in lowering pressure, the actual decrease in systolic pressure must be large enough (from three separate unequivocal readings) to leave no doubt. On this basis, a blood pressure of over 160 mm. must be reduced below 135 mm. Such data are shown by a plus or a minus or an equivocal (±) in Table II. Administration is I.V. unless otherwise indicated alongside the dose.

Table II shows examples of both synergism and potentiation, using the decarboxylase inhibition of two of the compounds used in this invention. The first shows two compounds, each inactive in itself, co-acting to give a hypotensive response because one is a potent decarboxylase inhibitor and the other is a potent catecholamine depleter but only an indifferent decarboxylase inhibitor. The second shows an active compound being used at a dose in which it by itself is inactive but being potentiated by a much more powerful decarboxylase inhibitor.

Compounds and compositions which are active in hypertensive rats are generally observed to be anti-hypertensive also in humans.

TABLE II.—ANTIHYPERTENSIVE ACTION IN RATS

| | Dose, mg./kg. | Result |
|---|---|---|
| (A) Pure compounds: | | |
| L-α-methyl-3,4-dihydroxyphenylalanine | 100 | + |
| | 40 | + |
| | 20 | ± |
| | 10 | − |
| | 100 PO | + |
| | 50 PO | + |
| | 25 PO | ± |
| DL-α-hydrazino-α-methyl-β-(3,4-dihydroxyphenyl)propionic acid. | 200 | − |
| | 100 | − |
| | 25 | − |
| DL-α-methyl-m-tyrosine | 100 | − |
| (B) Mixtures: | | |
| Equal quantities (dosage shows amount of each): | | |
| DL-α-methyl-m-tyrosine  DL-α-hydrazino-α-methyl-β-(3,4-dihydroxyphenyl)propionic acid | 50 | + |
| | 20 | + |
| | 10 | + |
| | 5 | ± |
| | 0.5 | − |
| | 0.1 | − |
| 10 mg/kg.-L-α-methyl-3,4-dihydroxyphenylalanine | | |
| Indicated quantities of: DL-α-hydrazino-α-methyl-β-(3,4-dihydroxyphenyl)propionic acid. | 10 | + |
| | 5 | + |
| | 1 | ± |
| | 0.5 | − |
| Equal quantities (dosage shows amount of each): DL-α-methyl-m-tyrosine  DL-α-hydrazino-β-(3,4-dihydroxyphenyl)propionic acid | 200 | + |
| | 100 | + |
| | 40 | + |
| | 20 | ± |
| | 10 | − |
| | 5 | − |

We claim:

1. The method of inhibiting mammalian decarboxylase which comprises administering to a mammal from 0.1 to 100 mg. per kg. per day of a compound selected from the group consisting of (1) Compounds of the formula

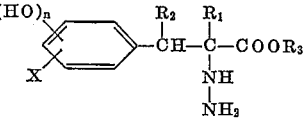

in which $R_1$, $R_2$ and $R_3$ are each selected from the group consisting of hydrogen and lower alkyl, n is a whole integer from 0 to 3, and X is selected from the group consisting of hydrogen, lower alkyl, halogen and trifluoromethyl, and (2) the non-toxic acid addition salts of the compounds of group (1).

2. The method of claim 1 in which the compound is α-hydrazino-α-methyl-β - 3,4 - dihydroxyphenylpropionic acid ethyl ester.

3. The method of claim 1 in which the compound is α-hydrazino-α-methyl-β - 3,4 - dihydroxyphenylpropionic acid ethyl ester.

4. The method of claim 1 in which the compound is α-hydrazino-α-methyl-β-3,4-dihydroxyphenylpropionic acid ethyl ester hydrochloride.

5. The method of claim 1 in which the compound is α-hydrazino-α-methyl-β-3-hydroxyphenylpropionic acid.

6. The method of claim 1 in which the compound is α-hydrazino-α-methyl - β - 2,4 - dihydroxyphenylpropionic acid.

7. The method of claim 1 in which the compound is α-hydrazino-α-methyl-β-3,4,5 - trihydroxyphenylpropionic acid.

8. The method of claim 1 in which the compound is α-hydrazino-α-methyl-β-2,4,5 - trihydroxyphenylpropionic acid.

9. The method of claim 1 in which the compound is α-hydrazino-α-ethyl-β-3,4-dihydroxyphenylpropionic acid.

10. The method of claim 1 in which the compound is α-hydrazino-α,β-dimethyl-β-3,4-dihydroxyphenylpropionic acid.

11. The method of claim 1 in which the compound is α-hydrazino-α-methyl-β - 2,3 - dihydroxyphenylpropionic acid.

12. The method of claim 1 in which the compound is α-hydrazino-α-methyl - β - 2,5-dihydroxyphenylpropionic acid.

13. The method of claim 1 in which the compound is α-hydrazino-α-methyl-β-2,3,4 - trihydroxyphenylpropionic acid.

14. The method of claim 1 in which the compound is α-hydrazino-β-(3,4-dihydroxyphenyl) propionic acid.

15. The method of claim 1 in which the compound is α-hydrazino-β-(3-hydroxyphenyl) propionic acid.

16. The method of claim 1 in which the compound is α-hydrazino-β-(4-hydroxyphenyl) propionic acid.

17. The method of claim 1 in which the compound is α-hydrazino-α-methyl-β-phenyl propionic acid.

References Cited

Nickel, Chem. Abst. vol. 27, p. 1357, 1933 Patent Office Scientific Library.

FRANK CACCIAPAGLIA, Jr., Primary Examiner

U.S. Cl. X.R.
424—319